United States Patent [19]

Higgins et al.

[11] 3,957,911

[45] May 18, 1976

[54] ALKYL VINYL IMPACT

[75] Inventors: Jerry G. Higgins; Cleve H. Forward, both of Big Spring, Tex.

[73] Assignee: Cosden Technology, Inc., Big Spring, Tex.

[22] Filed: Feb. 24, 1975

[21] Appl. No.: 552,560

[52] U.S. Cl. ............... 260/878 R; 260/2.5 L; 260/2.5 HA; 260/2.5 HB; 260/2.5 B; 260/880; 526/339; 526/347; 526/350
[51] Int. Cl.$^2$............................................. C08J 9/18
[58] Field of Search...... 260/2.5 L, 2.5 HA, 2.5 HB, 260/878 R, 880, 88.2 C

[56] References Cited
UNITED STATES PATENTS

| | | |
|---|---|---|
| 3,047,534 | 7/1962 | Dyer et al. ............... 260/880 R X |
| 3,068,192 | 12/1962 | White ............... 260/880 R X |
| 3,100,763 | 8/1963 | Meek et al. ............... 260/878 R X |
| 3,188,364 | 6/1965 | Brown et al. ............... 260/880 R |
| 3,370,105 | 2/1968 | De Bell et al. ............... 260/878 R X |
| 3,390,105 | 6/1968 | Verdol ............... 260/2.5 |
| 3,461,188 | 9/1969 | Baer ............... 260/878 R |
| 3,551,522 | 12/1970 | Miles et al. ............... 260/878 R |
| 3,627,840 | 12/1971 | Beer ............... 260/878 R X |

*Primary Examiner*—Morton Foelak

[57] ABSTRACT

A suspension copolymer of a higher alkyl vinyl and a vinyl benzene compound, said alkyl vinyl having from 14 to 60 carbon atoms.

3 Claims, No Drawings

ALKYL VINYL IMPACT

BACKGROUND OF THE INVENTION

The present invention relates to suspension polymerized alkyl vinyl copolymer with styrene and to its rubber modified impact; and more particularly, to a copolymer of monomeric higher alkyl vinyl with styrene grafted in suspension polymerization to a pure preformed rubber; and to the method of formation of these products by suspension polymerization.

According to the present invention, in a first aspect, it is found that styrene having its polymeric backbone modified as a copolymer with a minor quantity, less than about 15% of a monomeric alkyl vinyl compound has a built-in lubricating effect, superior in easy-flow molding to more perfect castings at lower molding pressures. The copolymer has a better stability of its lubricating properties in storage being resistant to variations over long storage periods, a common fault of crystal polystyrene particles which have been blended with extraneously added lubricants for molding. It is found moreover that this copolymer of such monomeric higher alkyl vinyl compound will expand with a foaming agent to a foam with smaller cells, a substantial advantage over many foamed products formed from foamable polystyrene.

In a second aspect, the invention includes the copolymer of a higher alkyl vinyl and styrene formed by suspension polymerization in the presence of preformed rubber particles, whereby the copolymer graft polymerizes to the rubber, forming superior high impact copolymer beads, both easily moldable, with good flow characteristics and of superior impact resistance.

The structure of applicant's copolymers are essentially the suspension polymerization copolymer of monomeric styrene with a minor quantity such as about 0.25 to 15%, preferably 0.5 to 6% by weight of a higher alkyl vinyl compound based on the weight of the copolymer without rubber. Where the final polymer is the ternary polymer to include preformed rubber, the polymer composition will consist of from 0.25 to 10% of such higher alkyl vinyl, 2.0 to 10% of preformed rubber, with the remainder being substantially styrene, copolymerized in suspension polymerization with the higher alkyl vinyl, and graft polymerized both as polymer and copolymer to the preformed rubber.

There are minor quantities of other components usually added in the suspension copolymerization to form the polymeric product as well as to improve its molding properties, namely small quantities of catalysts such as free radical catalysts typically an organic peroxy compound of the formula

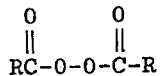

in which R is hydrocarbon, such as benzoyl peroxide, may be used. Suspension agents, typically fine particles of alkali earth metal phosphates such as calcium phosphate; surface-active agents such as higher alkyl sulfates typically dodecyl benzene sulfonate; polymer chain modifiers, typically alkyl mercaptans; and extra mineral lubricating oil may be present, generally in small quantity ranging from about 0.01% up to about 5%. Such additives serve to control the suspension polymerization and will generally be used in quantity of less than 1%, and where mineral lubricating oil is used, it is optional and would be present in quantity of about 1 to 5%.

The higher alkyl vinyl is a monomeric 1-olefin having at least 14 carbon atoms ranging up to about 60 carbon atoms and preferably will be in the range of 16 to 26 carbon atoms. The styrene is the common polymer base substance normally used herein but may be replaced with other vinyl aromatics, typically vinyl toluene, vinyl xylene, vinyl ethyl benzene and alphamethylstyrene to form similar products.

In forming the product, it is usual first to dissolve the rubber particles in polystyrene when an impact is being formed, mix the styrene monomer and alkyl vinyl monomer together with preformed rubber, add the small quantity of additives, catalyst, lubricating agents, etc., generally without the suspending agents, and then heat preliminarily with agitation at a temperature below about 90°C for 1–4 hours to initiate the polymerization as a mass prepolymerization reaction. That mass-polymer generally will be agitated until the mass becomes more viscous and inversion of the rubber occurs. After initial prepolymerization is completed, the prepolymer is suspended in water to which calcium phosphate particles have been added, the viscous liquid and water varying from 35 to 65% for either, continuing the agitation of the suspension in water with high speed mixing while slowly raising the temperature to the range of 95°–125°C under the autogenous pressure developed in a closed container for a total period of 7–24 hours of polymerization time. At that point the polymerization will have been completed to convert the polymer to small bead-like solids, the particles ranging in size from about 30–100 mesh U.S. Standard screen. The polymerization and heating are then discontinued, the settled particles are separated by decantation and are washed with dilute acid such as 10% HCl, rinsed in water to neutrality and dried. Such process of suspension with mass prepolymerization is generally shown in U.S. Pat. No. 3,188,364. While it is preferred to prepolymerize before suspension polymerization, the entire reaction may be carried out as normal suspension polymerization such as shown in U.S. Pat. Nos. to Dyer, et al 3,047,534, Meek, et al. 3,100,763 and White 3,068,192, without preliminary polymerization of the mixed monomers. These patents are here incorporated by reference.

While various commercial rubbers will improve the impact strength of the copolymer hereof, it is preferred to use a relatively pure polybutadiene such as Poly SAR, a product of Polymer Corporation in which the rubber is a polybutadiene having a 98% cis content, the 1-2 vinyl structure therein being less than 2% and is almost 100% soluble as a gel in styrene monomer. Other preferred rubbers are known as DIENE sold by the Firestone Tire & Rubber Company as DIENE 55 having a 38% approximate cis content with a narrow molecular weight range and DIENE 35 having an approximate 32% cis content and slightly lower MW range.

With respect to the reduction in cell size, foamed crystal styrene normally has cells ranging from 50–100 m$\mu$, but the copolymer hereof will be reduced to the approximate range of 20–50 m$\mu$ by the styrene copolymerization with the higher alkyl vinyl compound.

As to impact resistance, as well known in the art this varies somewhat with the quantity of rubber used, but it usually takes from 10–15% of graft polymerized rubber of the DIENE type to achieve an izod impact strength of 4–5 ft. lbs./in. in the product. The presence of 0.5 to 10% of higher alkyl vinyl copolymerized with the styrene will achieve an impact strength of 4–6 ft. lbs./in. with a moderate 6% rubber content.

Again, with respect to the inherent lubrication effect of the copolymer hereof, that is containing 0.5 to 10% of higher alkyl vinyl, the flow index of the copolymer is more than doubled. This copolymer may be polymerized to a higher molecular weight resulting from the copolymerized presence of the higher alkyl vinyl in the copolymer and this imparts a lubrication effect built into its molecular structure as well as higher shock resistance properties. It overcomes the problem, being self-lubricating during extrusion and does not lose lubricant as does an externally lubricated polymer in which the lubricant, such as mineral oil, is added in an extraneous mixture, and much of which may substantially be lost during storage and extrusion.

The modified higher alkyl vinyl impact, however, while having a correspondingly higher molecular weight also has a higher stress-crack resistance, thereby being a much tougher polymer.

The following examples illustrate the practice of this invention:

EXAMPLE I

A reactor was charged with 100 parts of monomeric styrene, 4 parts of higher alkyl vinyl (octadecene-1), 73 parts water, 0.4 parts benzoyl peroxide as catalyst, 0.7 parts finely powdered tricalcium phosphate and 0.04 parts dodecylbenzene sulfonate, all by weight.

The monomer solution was suspended by agitation with a mixer operated at 120 rpm, and the reactor was heated for 8 hours at 92°–125°C. After the polymerization was complete, the suspension product was removed from the reactor, acid washed and dried. The polymer had the following properties.
  g/10 min. = 29 flow
  Soln. Vis. = 14.6 cps
  Izod impact = 0.6 –0.9 ft. lb./in.
  MW = 70,000–100,000

EXAMPLE II

The reactor of Example I was charged with 100 parts styrene, 73 parts water, 0.4 parts benzoyl peroxide catalyst, 0.7 parts tricalcium phosphate, 0.04 parts dodecylbenzene sulfonate and 0.5 parts of a higher alkyl vinyl (hexadecene-1). The monomer solution was suspended and heated for 8 hours at 92°–125°C while stirring was similarly maintained at about 120 rpm.

After the polymerization was complete, the suspension product was removed from the reactor, acid washed and dried.

The polymer had the following properties:
  grams/10 mins. = 22
  Soln. Vis. = 14 cps
  Izod impact = 0.6 ft. lb./in.
  MW = 70,000–100,000

A sample of the crystalline polystyrene beads were expanded with pentane as an expanding agent to give foamed beads with cell sizes of 30–50 microns. A similar sample of crystalline polystyrene without the alkyl vinyl compound gave cell sizes of 60–80 microns. The alkyl vinyl compound decreases the average cell size in the expanded polystyrene foam.

EXAMPLE III

A batch suspension process was carried out using the same formulation as in Example II except that 3 parts alkyl vinyl (octadecene-1) compound was used. The izod impact was raised from 0.6 to approximately 1.0 lb./in.
  Polymer properties:
  grams/10 mins. = 8.2
  Soln. Vis. = 19.8 cps
  Aged Izod impact = 0.96 ft. lb./in.

EXAMPLE IV

A batch suspension process was carried out using the same formulation as the one described in Examples II and III except that 10 parts alkyl vinyl (octadecene-1) compound was used. The polymer properties were as follows:
  grams/10 mins. = 26
  Soln. Vis. = 12 cps
  Aged Izod impact = 0.86 ft. lb./in.

It is apparent from Examples I–IV that the alkyl vinyl copolymerized with the styrene increases the flow characteristics of the impact and reduces the cell size of the foam.

EXAMPLES V THROUGH VIII

Examples V through VIII were run with the same conditions in a reactor using the typical formulation described below:

| REAGENT | PARTS BY WEIGHT |
| --- | --- |
| Styrene | 100 |
| Rubber | 5–8 |
| Alkyl vinyl (hexadecene-1) | 0.5 – 10 |
| Water | 80–100 |
| Suspending and chain transfer agents** | 3–4 |
| Benzoyl Peroxide catalyst | 0.1 – 0.3 |

**The chain transfer agent was tert-dodecyl mercaptan in quantity 0.5 parts, the suspending agents same as Example I.

EXAMPLE V

HIPS with 4.5 Parts Alkyl Vinyl (Octadecene-1)

(6% Rubber used was Firestone Diene 35)*

*Firestone DIENE 35 is a 32% cis polybutadiene rubber made with butyl-lithium catalyst and a narrow molecular weight range.

The procedure was carried out as described above except that the alkyl vinyl compounds were added in the formulation. The reaction conditions were the same except that the mixture was pre-heated to 92°C in mass, with stirring, but without water for 1 hour and then transferred to a reactor with the water then added and stirred with heating up to 125°C.

Physical properties of the high impact polystyrene with 4.5 parts of octodecene-1 are the following:
  grams/10 mins. = 2.4
  Soln. Vis. = 16.1 cps
  Aged Izod Impact = 6.88 ft. lb./in.

EXAMPLE VI

HIPS with 2.5 Parts Alkyl Vinyl (Octadecene-1)

(6% Rubber used was Firestone Diene 55)**

Physical properties of polymer:
  grams/10 mins. = 8.3
  Soln. Vis. = 15.9 cps

Aged Izod Impact = 2.24 ft. lb./in.

*Firestone DIENE 55 — is a 38% cis polybutadiene rubber made with a butyl lithium catalyst and a narrow molecular weight range.

EXAMPLE VII

HIPS with 5.8 Parts Alkyl Vinyl (hexadecene-1)

(6% Rubber used was Polysar cis-rubber)***

Batch ran for 2 hours longer

Physical properties of polymer:
grams/10 mins. = 0.54
Soln. Vis. = 28 cps
Aged Izod Impact = 5.24 ft. lb./in.

***Polysar is a 98% cis polybutadiene rubber made with a Ziegler type catalyst.

EXAMPLE VIII

HIPS with 1.9 Alkyl Vinyl (Octadecene-1)

(6% Rubber used was Firestone Diene 35)

Physical properties of polymer:
grams/10 mins. = 6.4
Soln. Vis. = 19.6 cps
Aged Izod Impact = 2.10 ft. lb./in.

Examples IX through XIII were run in a reactor using the typical formulation described below:

| REAGENT | PARTS BY WEIGHT |
| --- | --- |
| Styrene | 100 |
| Rubber | 5–7 |
| Catalyst (peroxide) | 0.1 – 0.3 |
| Water | 95 |
| Suspension & chain transfer agents | 1.5 – 2 |
| Alkyl Vinyl | 0.5 – 10 |

EXAMPLE IX

HIPS with 2 Parts Alkyl Vinyl (hexadecene-1)

(6% Rubber used was Firestone Diene 55)

Physical properties of polymer:
grams/10 mins. = 5.17
Soln. Vis. = 20.8 cps
Aged Izod Impact = 2.56 ft. lb./in.

EXAMPLE X

HIPS with 4 Parts Alkyl Vinyl (Octadecene-1)

(7% Rubber used was Firestone Diene 35)

(No chain transfer agent was used)

Physical properties:
grams/10 mins. = 1.0
Soln. Vis. = 15.8 cps
Aged Izod Impact = 4.40 ft. lb./in.

EXAMPLE XI

HIPS with 5 Parts of Alkyl Vinyl (Octadecene-1)

(6% Rubber used was Firestone Diene 55)

(No chain transfer agent was used)

Physical properties:
grams/10 mins. = 2.13
Soln. Vis. = 19.7 cps
Aged Izod Impact = 5.6 ft. lb./in.

EXAMPLE XII

HIPS with 4 parts of Alkyl Vinyl (Octadecene-1)

(6% Rubber used was Firestone Diene 55)

(30% more peroxide catalyst was used)

Physical properties:
grams/10 mins. = 1.0
Soln. Vis. = 193.1 cps
Izod Impact = 6.44 ft. lb./in.

EXAMPLE XIII

HIPS with 3 Parts of Alkyl Vinyl (Octadecene-1)

(6% Rubber used was Firestone Diene 55 )

(No chain transfer agent was used)

Physical properties:
grams/10 mins. = 1.13
Soln. Vis. = 52.8 cps
Izod Impact = 6.32 ft. lb./in.

As illustrated by these examples, the alkyl vinyl monomer improves the flow characteristics of the polymer, being copolymerized therewith and stabily formed in situ, whereby the product has built-in high flow characteristics. The impact strength of even the copolymer polystyrene is increased significantly from the usual value from about 0.4 to about 1.0 lbs./in. without other impact modifying components such as rubber. Simultaneously, by the addition of a foaming agent and expansion of the foamable alkyl vinyl copolymer with styrene to a foamed polymer with about one-half the cell size, ranging from about 20 to 50 m$\mu$ where ordinary crystal polystyrene would have from 50–100 m$\mu$ cell size.

Ordinary rubbers of various types are known to increase the impact strength of polystyrene, for instance GRS rubber (styrene-butadiene copolymer) is known to increase the impact strength of polystyrene to about 3 ft. lbs. per inch izod notch with about a 6% rubber content, varying more or less with the variation in the rubber content. A pure high cis polybutadiene rubber having a cis content in the range of about 32 to 98% will usually increase the impact strength in a 6% rubber up to about 4 ft. lbs./in., and this too, will increase or decrease with the rubber content. However, as the examples show, this preferred pure polybutadiene rubber in a range of about 30–50% cis content, and of a narrow molecular weight range such as the DIENE rubber sold by Firestone under the brands 35 and 55, will increase the impact strength for a 6% rubber content alkyl vinyl copolymerized polystyrene to more than 5 and in some cases, as the examples show, more than 6 ft. lbs. per inch izod impact strength, again variable somewhat with the rubber content. Another commercial pure polybutadiene rubber of 98% cis content known as POLYSAR is also highly effective to form this impact. In general, the rubbers will be used in the range of about 2 to 10%, preferably about 4 to 8% based on the total polymer.

It will be noted that the alkyl vinyl hereof is a monomeric compound preferably having 16 to 25 carbon atoms, and preferably of straight chain, having the vinyl appearing in the 1-position thereof. The styrene polymer is a copolymer with the alkyl vinyl compound, and this copolymer is graft polymerized to the rubber as formed in the suspension polymerization. The rubber in each instance as used herein is a preformed rubber prepolymerized, and is added as a mixture with the monomeric styrene and alkyl vinyl. It reacts to form a graft polymer therewith. The rubber of this polybutadiene character of intermediate cis content and formed by butyl lithium catalysts, is of narrow molecular weight range and will substantially dissolve to a colloidal solution in the monomeric liquids to achieve a greatly improved polymer having the properties described.

It is preferred in the polymerization to prepolymerize the polymerization mixture to achieve a preliminary intermediate viscosity of the reaction mixture and the polymerization is then completed in suspension.

Certain modifications will occur to those skilled in the art. Other suspending agents, chain transfer agents, and the like, may be used in the suspension polymerization as known in the art, and the styrene per se may be substituted by alkyl groups.

What is claimed is:
1. A suspension copolymer of (1) a monomeric 1-olefin having 14 to 60 carbon atoms, (2) a vinyl benzene, and (3) 2 to 10% of a synthetic high cis-polybutadiene rubber having 30 to 98% cis content, said copolymer formed by copolymerizing said vinyl benzene with said monomeric 1-olefin and said rubber to graft polymerize said vinyl benzene both as a polymer and copolymer with said monomeric 1-olefin to said rubber.

2. The product of claim 1, wherein the vinyl benzene is styrene.

3. The product of claim 1, wherein the monomeric 1-olefin is a straight chain olefin having from 14 to 26 carbon atoms and is present in the copolymer in a quantity of 0.25 to 15%.

* * * * *